United States Patent [19]

Kadrmas

[11] 3,781,552

[45] Dec. 25, 1973

[54] SELF-CALIBRATING MULTIPLE FIELD OF VIEW TELESCOPE FOR REMOTE ATMOSPHERIC ELECTROMAGNETIC PROBING AND DATA ACQUISITION

[76] Inventor: Kenneth A. Kadrmas, 7909 Westhaven Dr., Huntsville, Ala. 35802

[22] Filed: Aug. 2, 1972

[21] Appl. No.: 277,437

[52] U.S. Cl.............. 250/206, 350/55, 350/294, 250/216, 356/4
[51] Int. Cl. .......................................... G01n 21/26
[58] Field of Search.................. 250/216, 218, 209, 250/203; 356/103, 104, 4, 5, 209; 350/55, 294

[56] References Cited
UNITED STATES PATENTS

| | | | |
|---|---|---|---|
| 3,411,852 | 11/1968 | Marinozzi, Jr. | 356/211 |
| 3,455,623 | 7/1969 | Harris | 350/55 |
| 3,510,225 | 5/1970 | Collis | 356/4 |
| 3,113,989 | 12/1963 | Gray et al. | 250/209 |

Primary Examiner—Walter Stolwein
Attorney—L. D. Wofford, Jr. et al.

[57] ABSTRACT

The invention is a transmitting and receiving telescope for use in generalized electromagnetic radiation communication systems, including atmospheric probing systems. The telescope optics, electromagnetic radiation source laser and receiver are coaxially aligned along the telscope axis. The telescope can be constructed with one received field of view or with a plurality of received fields of view. The telescope mirrors have apertures along the telescope axis to allow alignment laser pulse or CW radiation to travel along the telescope axis without being reflected. The preferred electromagnetic radiation source is a laser which can operate in both $TEM_{00}$ and $TEM_{01}$ modes. The $TEM_{00}$ mode is employed for alignment purposes since the energy of this mode is concentrated along the axis. The $TEM_{01}$ mode is used for data acquisition because the energy of this mode is concentrated in a donut shaped region having its hole centered on the axis. Constant intensity illumination is produced in the viewed area during data acquisition by separating the donut into inner and outer annuli along the line of maximum intensity and imaging the two beams to provide 100 percent overlay at the range of interest.

A preferred use for this telescope is in atmospheric probing LIDAR systems for measurements of the motion and concentration of the atmospheric environment, particularly pollution measurements. This LIDAR system uses a real time data processing system employing 800 megabit analog to digital converters and a correlation system to transform the acquired data into useable form in real time.

13 Claims, 13 Drawing Figures

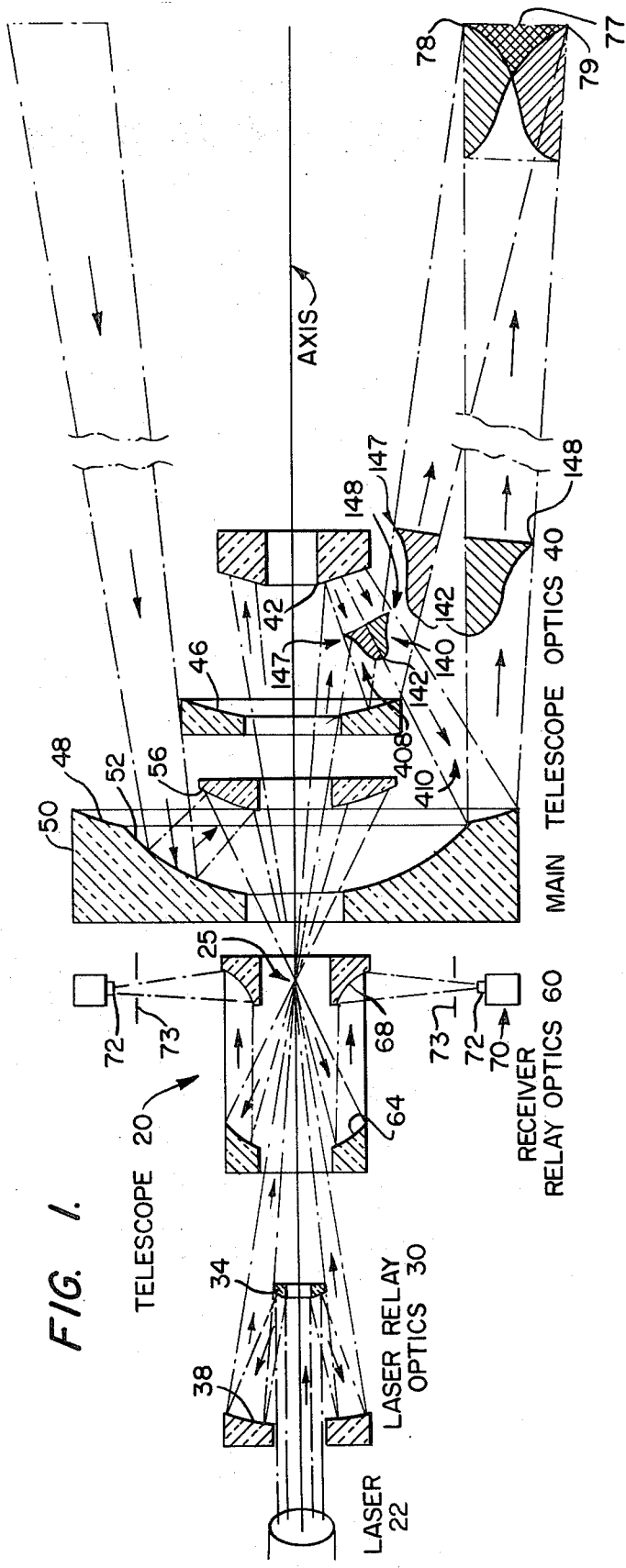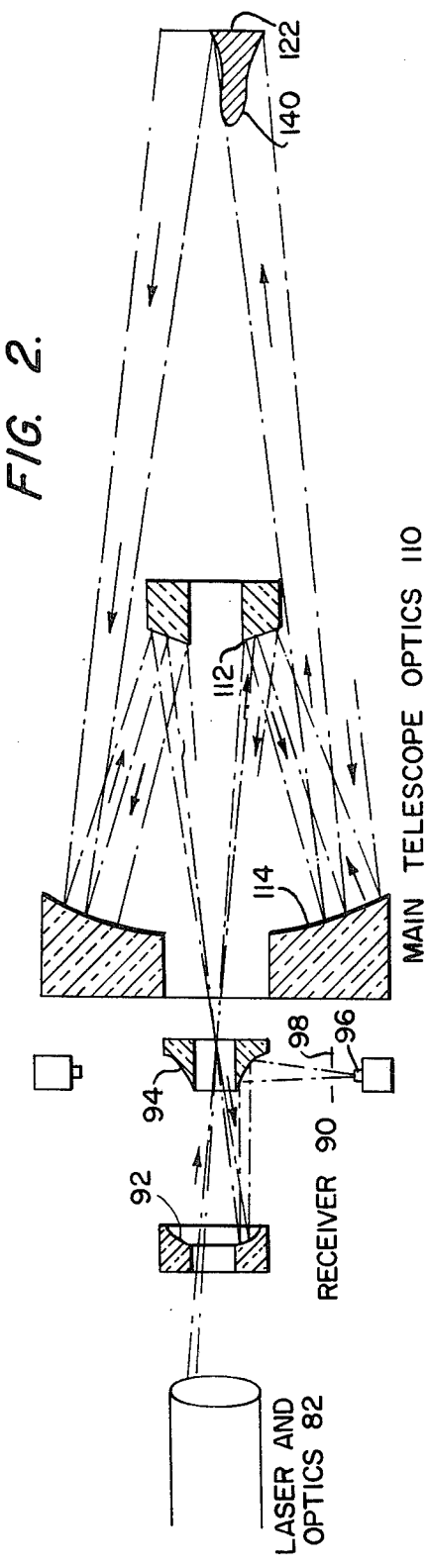

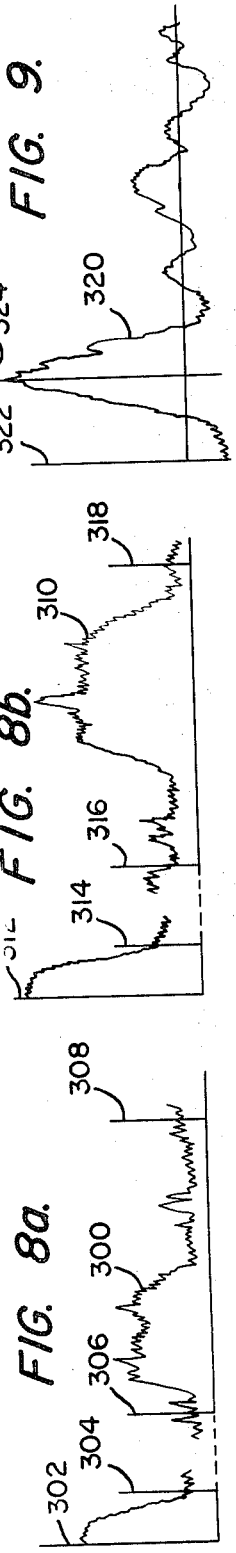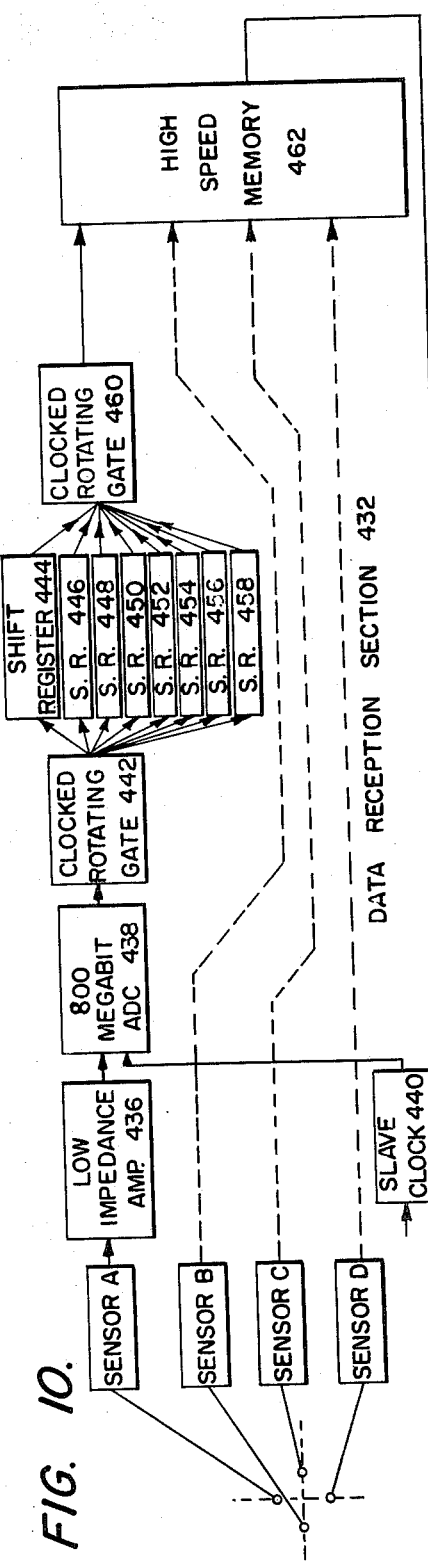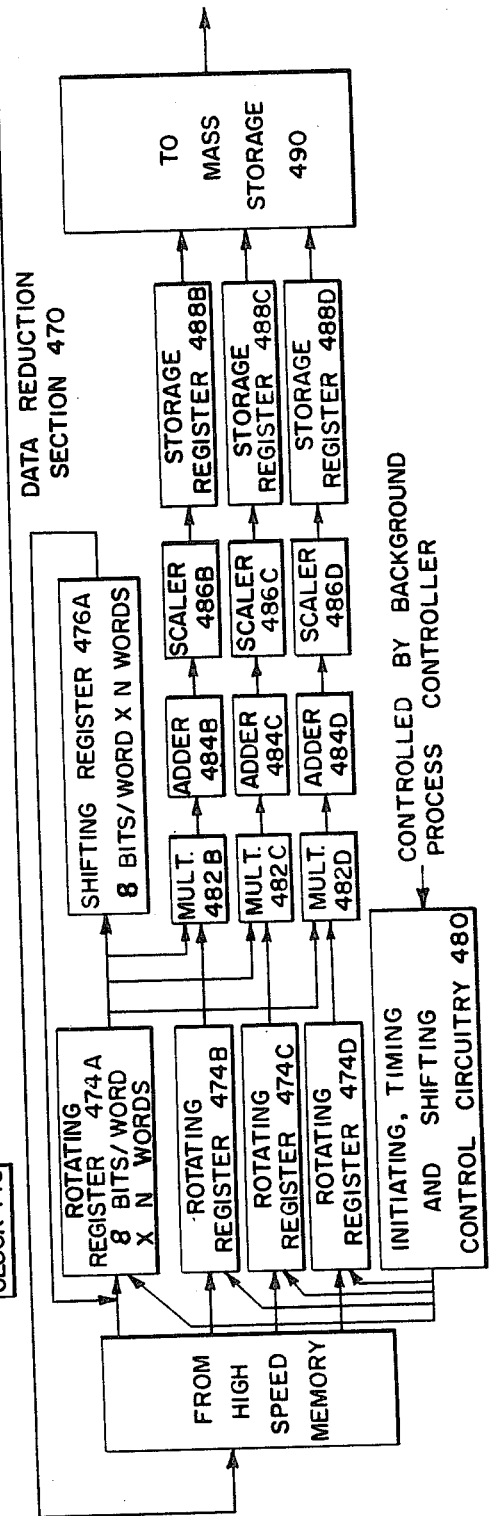

SELF-CALIBRATING MULTIPLE FIELD OF VIEW TELESCOPE FOR REMOTE ATMOSPHERIC ELECTROMAGNETIC PROBING AND DATA ACQUISITION

ORIGIN OF THE INVENTION

The invention described herein was made by an employee of the United States Government and may be manufactured and used by or for the government for governmental purposes without the payment of any royalties thereon or therefor.

BACKGROUND OF THE INVENTION

1. Field of the Invention

The invention relates to the field of transmitting-/receiving telescopes and to their use in LIDAR systems.

2. Prior Art

The prior art contains many telescopes which are designed for use as combination transmitting and receiving telescopes. These telescopes employ on axis mirrors to reflect either the transmitted beam or the received beam, or both, from or to, off axis systems. Such telescopes are difficult of alignment and are quite sensitive to vibrations which can cause misalignment. These telescopes are also unduly bulky because of the housing extensions which are necessary to house the off axis systems, i.e., laser sources and receivers.

Prior art laser probing systems which are also known as LIDAR systems (for Light Detection and Ranging) employ a single telescope which makes calibration of the returned signal difficult and prevents the use of correlation techniques in obtaining meaningful reduction of the data to information which is readily interpreted.

OBJECTS

A primary object of this invention is to provide an easily aligned transmitting and receiving telescope.

Another object is production of a single telescope having a plurality of received fields of view.

Another object is to provide a telescope having no partially reflecting on axis mirrors.

A further object is to produce a telescope having a laser source, transmission optics, receiver optics and a receiver sensing system, all of which are in coaxial alignment aling the telescope axis.

A still further object is to provide a transmitting and receiving telescope which directly measures the power of each transmitted laser output pulse for calibration of the receiver's sensors to establish an absolute standard for determining the percentage of the radiation which is reflected back to the telescope.

Another object is provision of a telescope which provides constant intensity illumination across the viewed area to eliminate problems of determining whether a change in received signal is due to a change in atmospheric reflectivity or a change in beam position.

Still another object of the invention is to provide a fan beam telescope which is easily aligned.

Still another object of the invention is to provide a coaxial telescope having a common focal point for the transmitted and received beams.

Still another object of the invention is to provide an improved LIDAR system for measuring atmospheric pollutants.

A further object is the provision of a LIDAR pollution measuring system which measures multiple points with each laser output pulse to provide comparison data for prompt drift rate measurements.

A still further object is to provide a LIDAR telescope having multiple fields of view.

A still further object is to provide a LIDAR system which produces reduced and correlated data in realtime.

SUMMARY

The above and other objects and advantages are achieved by provision of a multiple mirror telescope having a common, on axis, focal point for both the transmitted and received light beams. The transmitted rays make a smaller angle with the axis than the received rays. The larger angle formed by the received rays and the telescope axis is employed to separate the received beam from the transmitted beam. The electromagnetic radiation source which is preferably a laser is placed on axis and focused at the focal point by any appropriate optics. Sensors for measuring the intensity of the received beam are placed along the inside of a ring having the telescope axis as its axis.

Substantially uniform illumination of the area being probed is obtained by separating the donut shaped transmitted beam along its line of maximum intensity and focusing the two beams thus obtained to overlap at the area being probed.

Multiple received fields of view are obtained by dividing the returned beam into a plurality of beams and focusing each beam on a different photosensor.

The use of coaxial geometry makes the laser source easily changed when it is desired to change the frequency of the probing electromagnetic radiation.

The telescope system is made self-calibrating by the use of a common focal point for both the transmitted and received beams and the inclusion of a luminescent gas within the telescope enclosure. At the focal point the transmitted laser pulse is so intense that the gas exhibits luminescence. This luminescence is received by a photosensor through the receiver optics. The intensity of the luminescence is a direct measure of the transmitted pulse power, provided the laser output pulse is circularly polarized.

The pollution measuring LIDAR system employs two of the multiple fields of view transmitting and receiving telescopes. The telescopes are spaced apart and aimed at a common measurement volume in the sky. The proportion of the laser light which is reflected back to the telescope receiving sensors is measured as a function of time to determine the reflecting cross section of the measurement volume as a function of distance from the telescope. The use of two telescopes produces increased measurement accuracy and pollutant distribution analysis.

A computer data acquisition system employs 800 megabit analog to digital converters and correlation techniques to reduce the quantity of data which must be stored, while simultaneously producing the data in realtime, in a form which is readily analyzed to determine significant characteristics of the atmosphere and pollutant distribution therein.

BRIEF DESCRIPTION OF THE DRAWINGS

FIG. 1 is the preferred embodiment of the telescope.

FIG. 2 is an alternate embodiment of the telescope.

FIGS. 8a and 8b show possible photosensor outputs for two different fields of view for the same laser output pulse.

FIG. 9 shows the correlation of the photosensor outputs in FIGS. 8a and 8b.

FIG. 10 is a block diagram of the electronic data acquisition system.

DESCRIPTION OF THE PREFERRED EMBODIMENT

Figure 3A:
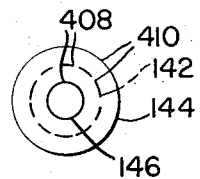
FIGS. 3a and 3b show the characteristics of the output pulse produced by the laser when it is operating in the $TEM_{01}^*$ mode.

The preferred embodiment of the telescope 20 is shown in cross section in FIG. 1. To prevent confusion, the optical system is shown without mechanical supports because the invention is in the optics and the supports are conventional.

Telescope 20 comprises four separate systems, a laser source 22, laser relay optics 30, main telescope optics 40 and receiver 60.

For the most efficient use of the system, laser 22 must be able to produce an output pulse in both $TEM_{00}$ and $TEM_{01}$ modes. The electromagnetic radiation produced may be either visible or invisible in accordance with the intended use of the telescope.

Figure 4A:
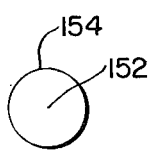
FIGS. 4a and 4b show the characteristics of the output pulse produced by the laser when it is operating in the $TEM_{00}$ mode.
Figure 4B:
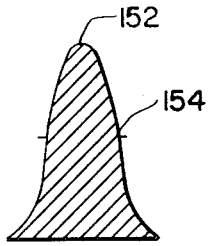

The characteristics of a $TEM_{00}$ laser output mode are shown in FIG. 4. FIG. 4a is the illumination pattern produced by $TEM_{00}$ mode, point 152 being the point of maximum intensity and circle 154 being at the half power point. FIG. 4b shows the power distribution as a function of the distance from the center of the beam. $TEM_{00}$ radiation is produced by most lasers.

Figure 3B:
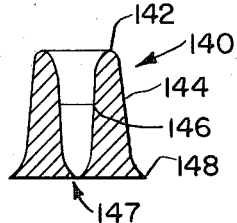

FIG. 3 shows the characteristics of a $TEM_{01}^*$ laser output mode. FIG. 3a is the illumination pattern produced by the $TEM_{01}^*$ mode, circle 142 being the line of maximum intensity and circles 144 and 146 being the half power points. A laser exhibiting this output mode is sometimes referred to as a donut laser because the beam illuminates a circular region containing a central non-illuminated area. FIG. 3b is a diagram of the intensity of a $TEM_{01}^*$ mode as a function of distance from the axis.

Whichever mode the laser is operating in, the laser output beam consists essentially of parallel rays of electromagnetic radiation. The use of a laser facilitates the easy changing of the frequency of the probing electromagnetic radiation. A slight axial displacement of the new laser from the position of the old laser will produce no effect on the focusing of the beam, since the parallel rays assure that the optical system will produce the same transformation of the parallel rays independent of small axial displacements of the laser.

The uses to which the two different laser output modes are put will be discussed below in connection with the alignment and operation of the telescope.

In the diagram of FIG. 1, the transmitted and received rays overlap and cross in the main telescope optics 40. To maintain the clarity of FIG. 1, within the main optics portion of the telescope, the transmitted rays are traced below the axis and the received rays are traced above the axis although it will be understood that both the transmitted and received beams are rotationally symmetric about the telescope axis.

Since the transmitted and received rays do not overlap or cross in the laser or receiver relay optics portions of the telescope both sets of rays are traced above and below the axis in these portions of FIG. 1.

Laser relay optics 30 focus a donut laser beam to a point at focal point 25 with the proper angle of convergence for the beam to strike a first secondary mirror 42 in the main telescope optics 40. Laser relay optics 30 comprise a secondary mirror 34 and a primary mirror 38. These mirrors reflect the donut laser beam causing it to converge to a point at focal point 25. Those skilled in the art will understand that although this two mirror system is the preferred mechanism for focusing the laser at focal point 25, other systems including lenses may be used.

Both of the mirrors of laser relay optics 30 have apertures along the telescope axis. These apertures allow a $TEM_{00}$ laser beam to travel down the telescope axis without being reflected or absorbed. This allows rapid alignment of the telescope as will be explained in detail hereinafter.

Main telescope optics 40 comprise two primary mirrors and two secondary mirrors, all of which are rotationally symmetric and are coaxially aligned along the telescope axis. The first secondary mirror 42 is located furthest from focal point 25, first primary mirror 46 is next furthest from focal point 25, while second secondary mirror 56 is between focal point 25 and first primary mirror 46. The second primary mirror 50 is located between the second secondary mirror 56 and focal point 25. Mirror 50 may preferably have two separate portions, a transmitting portion 48 and a receiving portion 52. Each of the mirrors has an aperture along the telescope axis to allow $TEM_{00}$ radiation to travel the length of the telescope without being reflected or absorbed.

A donut laser output pulse after being focused to a point at focal point 25 by laser relay optics 30 diverges and strikes secondary mirror 42. Mirror 42 reflects the transmitted rays back toward primary mirrors 46 and 48. First primary mirror 46 intercepts an inner annulus 408 of the donut pulse, while an outer annulus 410 passes the outer edge of first primary mirror 46 and strikes the transmitting portion 48 of the second primary mirror 50. This separation of the transmitted donut pulse into two different beams can be best understood by referring to FIG. 1 wherein the intensity pattern 140 of the donut pulse is superimposed on the beam's ray tracings. When the telescope is properly aligned, the line of maximum intensity 142 of the donut pulse will occur at the edge of mirror 46 whereby the inner portion 408 of the pulse, is reflected by mirror 46 and the outer portion 410 of the pulse, will pass mirror 46 and be reflected by mirror 48. Both portions 408 and 410 of the donut pulse range from zero intensity to maximum intensity. Mirrors 46 and 48 reflect the respective portions of the donut beam toward the area to be viewed. The two beams are aimed to fully overlap at the preferred viewing distance of less than 10 kilometers. As can be seen from FIG. 1, the transmitted laser output intensity in the viewed area is substantially uniform (within about plus or minus 10 percent) because the splitting of the transmitted beam results in the high intensity portion of beam 408 overlapping the low intensity portion of beam 410 and the low intensity portion of beam 408 overlapping the high intensity portion of beam 410. The intensities of the two beams thus add to produce a substantially uniform illumination of the viewed or target area.

The angle at which the transmitted beams 408 and 410 are reflected by mirrors 46 and 48 determine the size of the illuminated target area 77. The reflection angles for mirrors 46 and 48 are determined by the grinding of the mirrors. Therefore, the size of the target area cannot be changed once the telescope has been assembled.

The receiving portion 52 of the second primary mirror 50 receives radiation reflected from the target (viewed) area and reflects it onto the secondary mirror 56 which focuses the returned radiation to a point at focal point 25 (the same point at which the transmitted beam is focused).

Receiver relay optics 60 receive the returned beam and focus it on photosensors 72 which determine the intensity of the returned beam. This is accomplished by a primary receiver mirror 64 intercepting the returned beam as it expands after passing through focal point 25. Mirror 64 reflects the returned radiation back toward a secondary receiver mirror 68 which focuses the returned radiation on photosensors 72. A diaphragm 73 is placed between secondary mirror 68 and each photosensor 72 to control the percentage (image size) of the returned radiation which is allowed to impinge on the photosensor. Secondary mirror 68 determines how many received fields of view the telescope has. If this mirror is ground as a single surface which reflects all incident radiation to a common focal point, then the telescope will have a single field of view. If mirror 68 comprises a plurality of separate mirror sections each of which focuses the radiation it receives onto a different photosensor, then the telescope will have as many fields of view as there are such mirror sections. The preferred secondary mirror provides four different focal points so that the telescope has four fields of view. The photosensors 72 are supported on a ring 70. Ring 70 and secondary mirror 68 are preferably made rotatable together through an angle of plus or minus 40°. This rotation allows the position of the fields of view to be changed relative to the ground plane without the necessity of rotating the entire telescope. A total rotation of 90° would cause the new field of view of one photosensor to be identical to the old field of view of an adjacent photosensor. A rotation of only plus or minus 40° for a total rotation of 80° is employed because the remaining 10° are taken up by the spiders which support the mirrors in the main telescope optics 40. The spiders would prevent received radiation from reaching a photosensor positioned in the omitted 10°.

Figure 5:
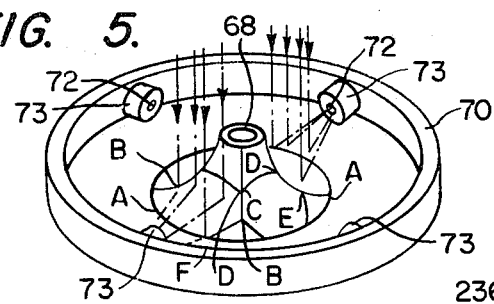
FIG. 5 shows the secondary mirror which is used to focus the received radiation on the photosensors of the receiver.
Figure 6:
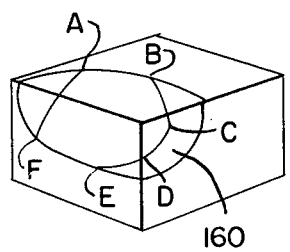
FIG. 6 shows a parabolic mirror, sections of which are employed in the mirror of FIG. 5.

A further understanding of the construction of secondary mirror 68 may be obtained by referring to FIGS. 5 and 6. FIG. 5 is a perspective view of mirror 68 and photosensor support ring 70, looking from the general direction of receiver primary mirror 64. The secondary mirror shown in FIG. 5 is one which produces the preferred four fields of view. As can be seen from the diagram, mirror 68 focuses the returned radiation on four different photosensors 72. To accomplish this mirror 68 is made of sections of a parabolic mirror. One section of a parabolic mirror which may be employed is shown in FIG. 6. FIG. 6 shows one quarter of a parabolic mirror 160, a section of which is used as one of the four sections of mirror 68. Points A, B, C, D, E and F delineate the intersections of line segments which form the circumference of mirror 68. These same letters are shown in FIG. 5 to provide an orientation as to the position of the section of parabolic mirror 160. The use of four parabolic sections in this secondary mirror 68 provides four separate focal points for the received beam and thus provides telescope 20 with four received fields of view.

Telescope 20 is contained within a hermetically sealed housing in order to prevent contamination of the mirrors by dirt and moisture. The hermetic housing is charged with a quantity of an luminescent gas. The specific luminescent gas and its pressure are selected so that the transmitted laser output pulse causes the gas to exhibit luminescence in a restricted region at focal point 25. The quantity luminescence thus exhibited may be measured to determine the intensity of the transmitted pulse.

Filters may be placed over the end of the telescope housing to prevent background radiation from reaching photosensors 72. This filtering will improve the signal to noise ratio at the output of sensors which respond to the background radiation.

An alternative embodiment of the telescope of this invention is shown in FIG. 2 as telescope 80. Telescope 80 is in all respects similar to telescope 20 except that it employs only two mirrors in the main telescope optics 110 and does not provide for splitting the transmitted beam to provide substantially constant illumination in the viewed area.

Figure 7:
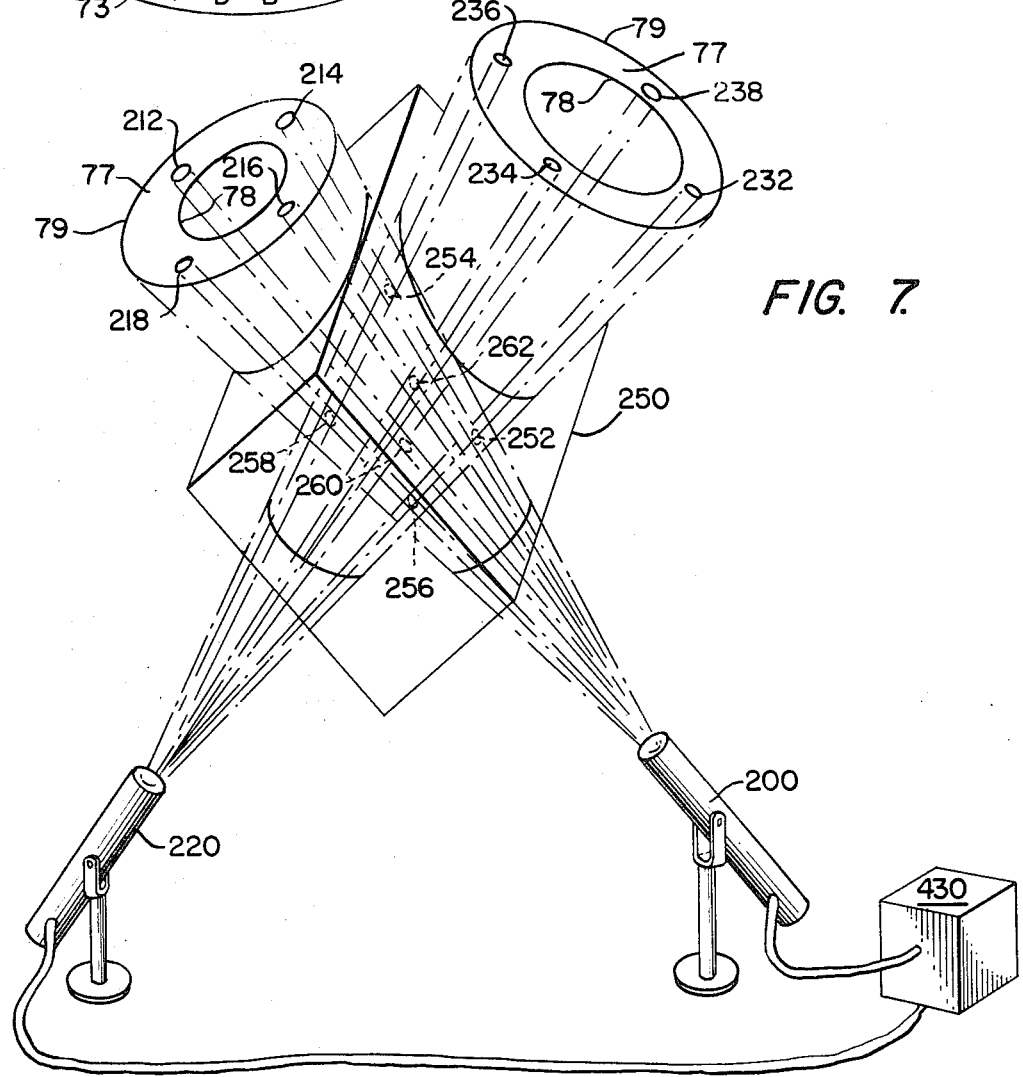
FIG. 7 shows the LIDAR system and the measurement volume.

A LIDAR system employing the multiple fields of view (MFOV) telescope of this invention is shown in FIG. 7. Two MFOV telescopes 200 and 220 are employed. The telescopes are preferably placed less than 5 kilometers apart and aimed at the same measurement volume 250 of the sky. Both telescopes transmit the data they receive to an electronic data acquisition system 430. This transmission may be by telephone wire, radar or laser beam.

The LIDAR data acquisition system 430 is shown in FIG. 10 and comprises a data reception section 432 and a data reduction section 470. The data reception section is comprised of a separate channel for each telescope data photosensor. Each of these channels comprises a low impedance amplifier 436 to amplify the photosensor output, a 800 megabit analog to digital converter (ADC) 438 which is controlled by clock 440, and a set of shift registers 444–458 whose inputs are connected to the output of the ADC 438 in succession by a clocked rotating gate 442. The shift register outputs are connected to a high speed memory 462, in succession by a second clocked rotating gate 460.

Data reception section 432 receives the data from the photosensors in analog form and converts it to equivalent sampled digital information for subsequent processing. Each transmitted laser output pulse causes the data reception section to process one amplitude time (space) history for each channel. An amplitude time history is a record of the amplitude of the photosensor output as a function of time.

High speed memory 462 provides temporary storage for the amplitude time history data and provides this data to data reduction section 470 which integrates and correlates the data to convert the data to a useful format. The data reduction system comprises an 8 bit per word N word rotating register 474, for each photosensor 72. Where N is the number of sampled data points stored in high speed memory 462 for each amplitude time history and is a around 1000 with 1024 being preferred since it is a power of two. Both the photosensors 72 and rotating registers 474 will be referred to with suffixes A, B, C, or D, when it is desirable to distinguish one channel from another, while no letter designation will be used when there is no need to distinguish between the different channels. Hereinafter, the A channel will be arbitrarily designated as a reference channel.

The output from rotating register 474A is connected to the input of a 8 bit per word N word shift register 476A. The output of shift register 476A is connected back to the input of rotating register 474A.

The output of each of the rotating registers 474B, C and D is connected to one input of a corresponding multiplier 482B, C and D respectively. The output of each multiplier is connected to the input of a corresponding adder 484 whose output is connected to a corresponding scaler 486. The output of each scaler is connected to a corresponding storage register 488 whose output is transmitted to a mass storage system 490.

The output of rotating register 474A is connected as a second input to each muliplier 482 B, C, and D.

The operation of each rotating register is controlled by an initiating, timing and shifting control system 480. Timing system 480 is controlled by a background process controller which also controls mass storage 490.

The multipliers 482 B, C and D and their associate circuitry calculate the correlation functions A vs. B, A vs. C and A vs. D respectively. Shift register 476A allows the time delay between the A amplitude time history and the other time histories to be controlled so that the correlation phase which yields the maximum peak correlation value may be found for each channel B, C and D.

Assuming that measurement volume 250 is 1.5 kilometers from the telescope and that a minimum of 1000 equally spaced data points are desired per amplitude time history, the speed requirements for ADC 428 can be readily calculated.

At a speed of $3 \times 10^8$ meters/second, it takes electromagnetic radiation $1.0 \times 10^{-5}$ seconds to travel 3 kilometers (round trip distance). 1024 data point values must be obtained during this $1.0 \times 10^{-5}$ second time period which requires that one data point be obtained each $1 \times 10^{-8}$ seconds. This requires that data point values be obtained at a rate of $1 \times 10^8$ data points per second. Since an amplitude resolution of 8 bits per data point is desired in order to obtain accurate data, this data point rate requires a ADC bit rate of $8 \times 10^8$ bits per second or 800 megabits per second.

Returning to telescope 20, the following is the procedure for aligning the telescope. First, the telescope is mechanically aimed at a target area which is preferably spaced from the telescope by the desired viewing distance of less than 10 kilometers.

Laser 22 is then operated in a continuous output $TEM_{00}$ mode. The laser output thus produced passes down the axis of the telescope unobstructed, emerges from the telescope and strikes the target area. The point of maximum illumination on the target area is marked. The laser is then switched to transmit $TEM_{01}$* output mode which is reflected and focused by the telescope optics. One of the two split portions of the donut beam may be blocked at the telescope output, since at that point the beams do not overlap. It is preferable to block the inner transmitted beam 408 so that the first secondary mirror and the second primary mirror may be aligned.

These mirrors are aligned when the transmitted donut pulse 410 is positioned so that the center of the donut is at the previously marked maximum intensity point for the continuous $TEM_{00}$ alignment beam. The location of this donut pulse is then marked for future reference. Now the outer transmitted donut beam is blocked and the inner donut beam 408 is allowed to strike the target. Mirror 46 is aligned so that the position of the donut pulse coincides with that of the previously marked donut pulse. Thereafter, intensity measurements are made to assure that the donut beam is being split at its line of maximum intensity. The telescope transmission optics are now aligned.

Next, second secondary mirror 56 is aligned to focus the viewed area at focal point 25. Thereafter, receiver relay mirrors 64 and 68 are aligned to focus the received beam on the photosensors. The telescope is now completely aligned and is ready for data acquisition operation.

OPERATION OF THE PREFERRED EMBODIMENT

To obtain data, laser 22 is operated in a pulsed $TEM_{01}$* mode. The laser omits a donut output pulse of electromagnetic radiation which is reflected by secondary laser relay optics mirror 34 onto primary laser relay optics mirror 36 which focuses the laser output pulse at focal point 25. The radiation intensity at focal point 25 causes the specially chosen gas within the telescope housing to exhibit luminescence. Most of the luminescence is radiated in a backward direction, i.e., toward receiver primary mirror 64. That part of the luminescence which strikes mirror 64 in the receiver relay optics is reflected to mirror 68 which in turn reflects the radiation towards the photosensors 72. The luminescence striking the photosensors produces an electronic pulse at the output of the photosensors which is proportional to the energy of the laser output pulse and provides calibration information for the received signals. If the pulse of luminescence is so strong as to overload the photosensors and prevent the proper response to the received signal from the viewing area, then the photosensors may be maintained inactive during the luminescent period. If the receiver photosensors are held inactive during the luminescent period, then a separate (fifth) sensor is provided whose sole purpose is to respond to the luminescence to provide an output pulse for use in calibrating the receiver photosensors.

After the output pulse from laser 22 passes focal point 25, the diameter of the donut expands with distance from the focal point 25. The pulse then strikes the first secondary mirror 42 of the main telescope optics 40. Mirror 42 reflects the pulse toward first and second primary mirrors 46 and 48. As was explained above, inner portion 408 of the pulse is reflected by mirror 46 and outer portion 410 of the pulse is reflected by mirror 48. The reflected pulses then travel outward from the end of the telescope housing and overlap at the desired viewing range.

As the electromagnetic radiation travels outward toward the viewing area, it is reflected and scattered by particles in the atmosphere. Some portion of the reflected radiation will be reflected toward the telescope, thus as soon as the laser beams leave the telescope, the telescope will begin to receive returned radiation. However, the returned radiation which is of primary interest is that which is returned after the end of the period of time required for the laser output pulse to travel to the near side of the measurement volume and back. The returned radiation strikes second primary mirror 52 and is reflected to the second secondary mirror 56 which reflects the radiation and focuses it at focal point 25. After passing through focal point 25, the returned beam expands and strikes receiver mirror 64 which reflects it toward receiver mirror 68. Receiver mirror 68 reflects the received radiation to the photosensors 72. Photosensors 72 produce a continuous electrical output which is proportional to the radiation being received. Diaphragms 73 are preset to control the quantity (image size) of radiation striking the photosensors to prevent them from becoming overloaded when a large percentage of the transmitted radiation is reflected back toward the telescope.

In the preferred embodiment where mirror 68 comprises four separate parabolic sections which reflect the return beam toward four separate photosensors, returned radiation is received only from four restricted portions of the viewing area. When diaphragms 73 are set to restrict the quantity of radiation received, they also reduce the size of the individual viewing areas, since radiation reflected from the outer portions of what would otherwise be one of the individual viewing areas is prevented from reaching the photosensor. The four separate viewing areas allow data on four separate areas to be received on each laser output pulse. These four viewing areas will produce essentially identical data when sky conditions are homogeneous. However, where sky conditions are non-homogeneous, as in the area of a smoke plume where there is a gradient in the pollutant density, each individual viewing area will produce significant independent data.

The telescope of this invention is designed for use in a LIDAR atmospheric probing system such as is shown in FIG. 7. The measurement volume 250 is preferably located less than 10 kilometers from each telescope. Each telescope projects its transmitted beam through the measurement volume 250. The viewing area 77 as shown in FIGS. 1 and 7 has an inner circumference 78 and an outer circumference 79. Within each viewing area four individual viewing areas are defined as a result of the configuration of mirror 68 which has been selected as the secondary mirror of the receiver relay optics. For telescope 200 these individual viewing areas are 212, 214, 216 and 218. Each of these viewing areas is located within the transmitted beam of telescope 200. The individual viewing areas for telescope 220 are shown as 232, 234, 236 and 238. If desired, by rotating the receiver's secondary mirror 68 and photosensors 72, the beams may be aligned so that two viewing areas for each telescope are in a common plane. Thus, viewing areas 214 and 218 for telescope 200 and viewing areas 232 and 236 for telescope 220 are shown as being in a common plane. This results in radiation traveling from viewing area 214 passing through two volumes of the atmosphere (252 and 254) through which radiation traveling from viewing areas 232 and 236 also passes, respectively. Thus, any pollutant within the volume 252 will be reflected in the data signal from the sensor for viewing area 214 and viewing area 232. Similarly, any pollutant in volume 254 will be reflected in the signals from both viewing area 214 and 236. Viewing area 218 intersects both viewing areas 232 and 236 in a manner similar to that of viewing area 214. These intersections comprise common volumes 256 and 258. Four intersections of this variety can always be obtained by rotating the beams with respect to each other. Two additional common volumes may be obtained when the measurement volume is equidistant from both telescopes, so that their transmitted beams and individual viewed areas have both diverged a common amount. In that situation, the viewing areas which are not in the common plane will intersect. Thus, viewing area 212 from telescope 200 will intersect with viewing area 238 from telescope 220 while viewing area 216 of telescope 200 will intersect with viewing area 234 of telescope 220, thus, creating common volumes 260 and 262 respectively. Various other patterns of common volumes may be obtained by proper orientation of the received fields of view. These common volumes give the system its outstanding data acquisition abilities. However, the system produces superior data even when the individual viewing areas of the two telescopes are not aligned to generate common volumes.

Each telescope is intended to receive only radiation which is reflected from its own transmitted pulse, since it is desired to have a definite distance calibration to the amplitude time history.

The information which is received during data acquisition will be more readily understood by reference to FIGS. 8a, 8b and 9. In FIG. 8a an amplitude time history 300 for the output of the photosensor which responds to radiation received from one viewing area (A) is shown. Line 302 is the zero time point of this time history and is the point of maximum amplitude output of the calibration signal. The calibration signal can be taken to last from point 302 to point 304. The point of maximum amplitude of the calibration signal is also used to initiate the data acquisition cycle, thus assuring proper timing. Between points 304 and 306 is the period when signals are being received only from the area between the telescope and the measurement volume. This time period has been greatly reduced in both FIGS. 8a and 8b because it produces no relevant data. The portion of curve 300 which occurs between points 306 and 308 can be referred to as the target time and is the photosensor output for radiation which is reflected by the measurement volume.

Curve 310 of FIG. 8b is an amplitude time history for the output of a photosensor which responds to radiation received from a different viewed area (B) on the same transmitted pulse. These amplitude histories are for some pollutant volume such as a smoke plume from a factory. Curve 320 of FIG. 9 is a cross correlation signal for the amplitude time histories shown in FIGS. 8a and 8b. Point 322 of FIG. 9 marks the beginning of the first measurement volume response at line 306 of FIG. 8a. Line 324 marks the maximum amplitude of the correlation function. The distance between lines 322 and 324 reflects the difference in the length of time for the transmitted pulse to travel to and from the smoke plume in the two different viewing areas. This distance therefore reflects the difference in telescope to pollutant distance for the two different viewing areas. It will be understood that the correlation function between each pair of amplitude time histories is calculated digitally by data acquisition system 430.

During data acquisition, the amplitude time histories for all of the viewed areas are processed simultaneously by data reception section 432. Since the processing of is identical for each channel within section 432 only one channel will be discussed. Duplicate equipment processes each other channel similarly.

As the transmitted pulse passes through focal point 25, the gas in the vicinity of the focal point exhibits luminescence. The luminescence causes photosensor 72 to produce a calibration pulse at its output. This pulse initiates a data acquisition cycle.

Amplifier 436 amplifies the calibration pulse and applies it to the input of ADC 438. Slave clock 440 causes ADC 438 to take a sample and produce a digital output every $x$ seconds, where $x$ is such that 1024 data samples will be taken during the desired length of the data cycle. Thus, if the target area is 1.5 kilometers from the telescope, a sample is taken once every $1 \times 10^{-8}$ seconds. Similarly if the target area is 7.5 kilometers from the telescope, one data sample is taken every $5 \times 10^{-8}$ seconds.

After passing through focal point 25 the donut pulse expands and strikes first secondary mirror 42 and is reflected back toward the primary mirrors. Mirrors 46 and 48 reflect portions 408 and 410 toward the viewed area 77.

Once the transmitted pulses enter the field of view of photosensor 72, the photosensor will begin to receive radiation which is reflected from particles in the atmosphere. Every $x$ seconds ADC 438 takes a sample of the sensor output until the full 1024 data samples have been obtained.

As each data sample is provided at the output of ADC 438, it is gated to a different one of shift registers 444–458 for instantaneous storage. The contents of the shift registers are transferred to high speed memory 462 in sequence, but interleaved with the outputs of the shift registers from the other channels.

Once all of the data values for the transmitted pulse are stored in memory 462, the data is transmitted to data reduction section 470. The data from each channel is transferred to the corresponding rotating register 474A, B, C or D. Once the data is in the rotating registers, the background process controller takes control and data reception section 430 may start another data cycle.

The registers 474 are rotated in unison so that their outputs are supplied to multipliers 482 simultaneously. Multipliers 482 produce at their outputs, the product of their two inputs. These values are added, scaled and stored in registers 488 and then transferred to storage. Upon completion of the rotation cycle, correlation functions A vs. B, A vs. C, and A vs. D are stored.

Once the rotating registers have completed a cycle, shift register 476 is employed to reload register 474A with a delayed or advanced version of the channel A amplitude time history. The correlation function calculation is then repeated. Once all of the correlation functions have been calculated with the relevant phases, the highest peak value for each correlation function is retained for permanent storage as is its phase. The rest of the correlation results are discarded. The correlation functions B vs. C, B vs. D and C vs. D are preferably calculated simultaneously on duplicate equipment.

The value of the calibration signal for each channel and the integrated value of each amplitude time history is also stored.

Thus, while 4096 data points were originally obtained per telescope for each light pulse, only 20 data values are stored, four calibration signal values A, B, C and D; four integrated amplitude time history values A, B, C and D; six peak correlation function values A vs. B, A vs. C, A vs. D, B vs. C, B vs. D and C vs. D; and finally the phase values for the six correlation functions. This is a data reduction of 200 times. A data reduction of 250 times may be obtained by normalizing every value by the calibration signal values and not storing them.

The above is a full and complete description of the construction and operation of the preferred embodiment of this invention. While the invention has been described in terms of the preferred embodiment thereof, it will be understood by those skilled in the art that many variations can be made therein, both in the telescope system and in the LIDAR system without departing from the scope of the invention as defined in the claims.

I claim:

1. A transmitting and receiving telescope system comprising:
   electromagnetic radiation source means for producing a donut output beam;
   transmission optics means for separating the donut output beam into separate beams directed toward a common target area, and;
   receiver optics means for focusing radiation received from the target area onto photosensor means, said photosensor means producing an electrical output which is a function of the instantaneous intensity of the radiation striking the photosensor means.

2. The apparatus of claim 1 wherein the receiver optics means separates the received radiation into a plurality of received beams and wherein the photosensor means comprises a separate photosensor for each received beam, whereby the telescope has a plurality of received fields of view.

3. The apparatus of claim 1 wherein the transmission optics means comprises:
   first and second primary mirrors and a first secondary mirror;
   said first secondary mirror intercepting and reflecting the donut output beam toward the primary mirrors;
   said first primary mirror intercepting an inner annulus of the donut beam and reflecting it toward the target area;
   said second primary mirror intercepting an outer annulus of the donut beam and reflecting it toward the target area.

4. The apparatus of claim 3 wherein the first and second primary mirrors reflect the respective portions of the donut beam so that they overlap at the target area whereby substantially uniform illumination of the target area is produced.

5. The apparatus of claim 3 wherein the inner annular beam ranges in intensity from a minimum value to the maximum intensity of the original beam and the outer annular beam ranges in intensity from a minimum value to the maximum intensity of the original beam.

6. The apparatus of claim 4 wherein each mirror has an aperture centered on the telescope axis whereby radiation may traverse the telescope along its axis without obstruction.

7. The apparatus of claim 3 wherein a portion of the second primary mirror receives radiation from the target area and reflects it onto a second secondary mirror;

said second secondary mirror reflecting the received radiation onto a primary receiver mirror in the receiver optics means;

said primary receiver mirror reflecting the received radiation onto a secondary receiver mirror which reflects and focuses the radiation onto the photosensor means.

8. The apparatus of claim 7 wherein the receiver secondary mirror is multi-sectional and focuses different portions of the received beam onto different individual photosensors of the photosensor means, whereby the telescope has multiple received fields of view within the target area.

9. The apparatus of claim 7 wherein both the transmitted and received beams are focused to a point at a common focal point, said common focal point being within a gas tight housing charged with sufficient luminescent gas for the transmitted beam to cause the gas to exhibit luminescence in the vacinity of the common focal point, whereby the response of the photosensor means to the luminescence provides a measure of the power of the transmitted beam and may initiate a data reception cycle.

10. The apparatus of claim 7 wherein each mirror has an aperture centered on the telescope axis to allow radiation to traverse the telescope along its axis without obstruction.

11. A transmitting and receiving telescope comprising: electromagnetic radiation source means for producing a donut output beam, said radiation source means being coaxial with the telescope;

transmission mirror optics means for receiving the output pulse and directing it toward a target area;

receiver mirror optics means for receiving radiation from the target area and focusing it on photosensor means, said photosensor means producing an electrical output signal which is a function of the instantaneous intensity of the radiation striking the photosensor means;

each mirror having an aperture along the telescope axis whereby radiation may traverse the telescope along its axis without obstruction.

12. The apparatus of claim 11 wherein both the transmitted donut beam and the received beam are focused to a point at a common focal point and the common focal point is within a gas tight housing which is charged with sufficient luminescent gas whereby the transmitted beam causes the gas to exhibit luminescence and the photosensor means is struck by the luminescence and produces an output signal which is a function of the transmitted pulse intensity.

13. A LIDAR atmospheric probe system comprising: a pulse transmission electromagnetic radiation source for illuminating a target area;

a plurality of photosensors each responsive to radiation received from a different viewed area within the target area, each photosensor producing an electrical output signal which is a function of the instantaneous intensity of the radiation striking it;

data reception means comprising a separate channel connected to the output of each photosensor;

each channel comprising analog to digital converter means for sampling the photosensor output signal and producing a digital representation of the output signal amplitude;

each channel being connected to memory means for storing the digital values and; data reduction means connected to the memory means for receiving the digital values, said data reduction means including correlation means for obtaining the phase and peak correlation values between the responses of the different photosensors.

* * * * *